Patented June 29, 1943

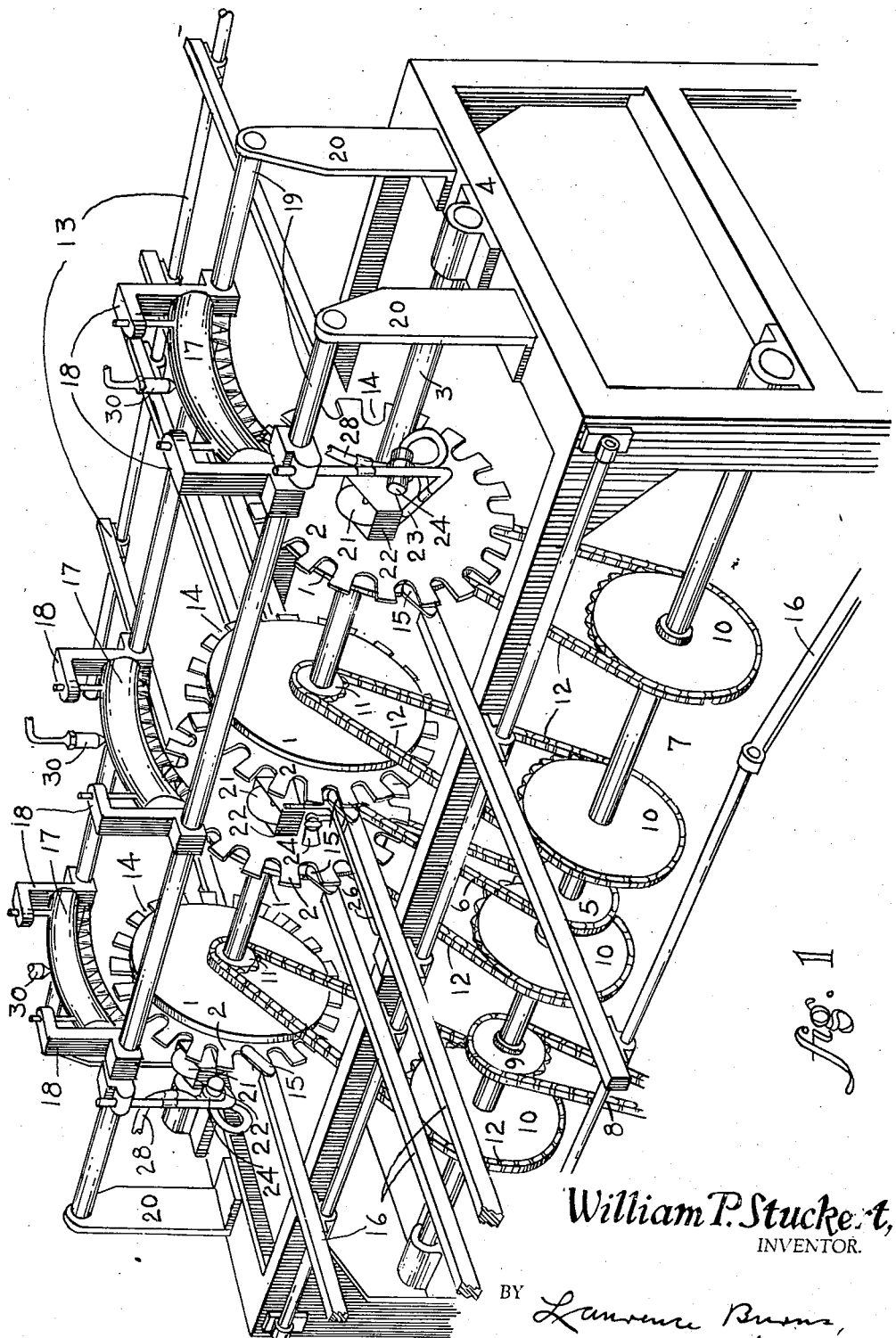

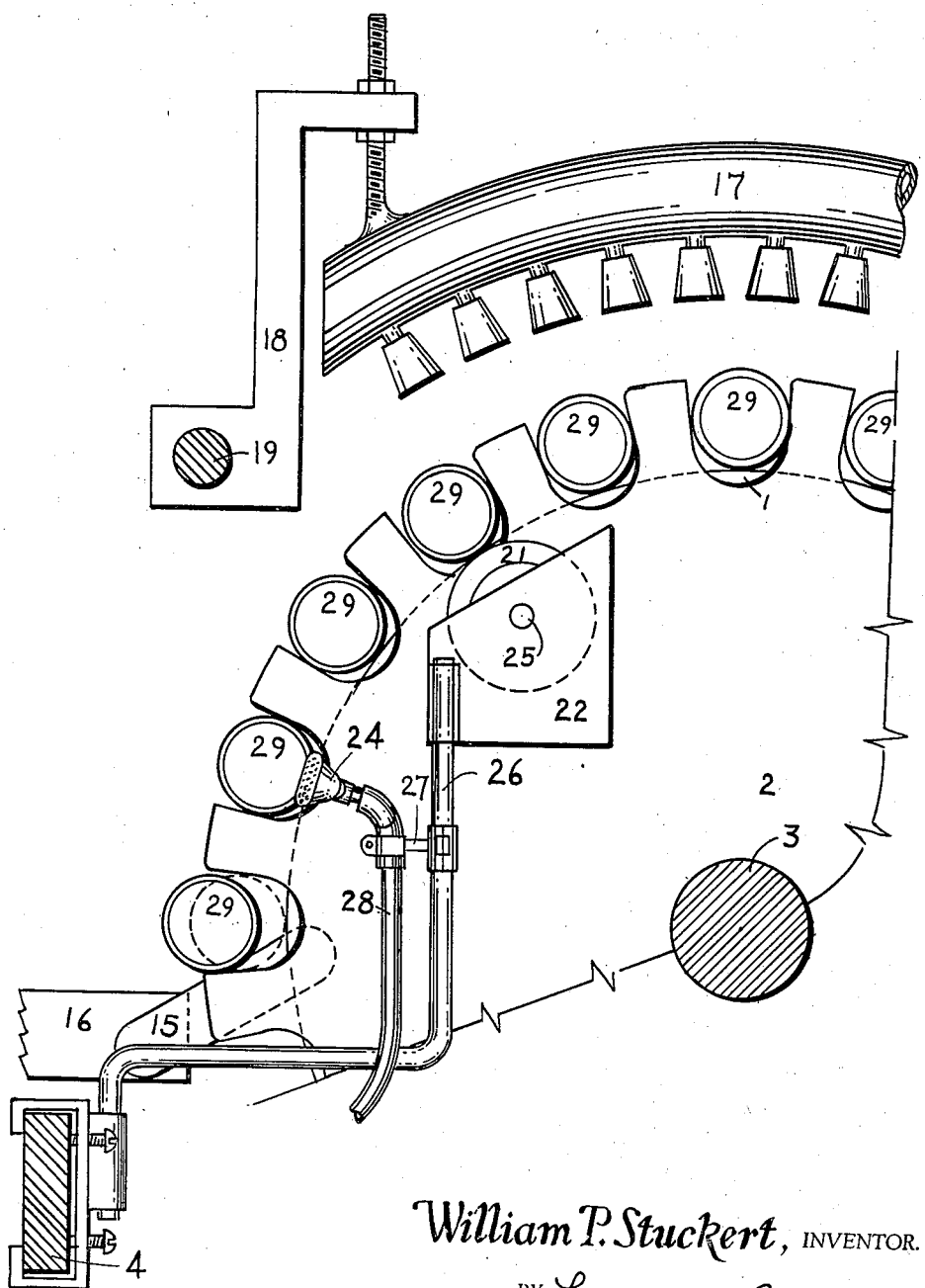

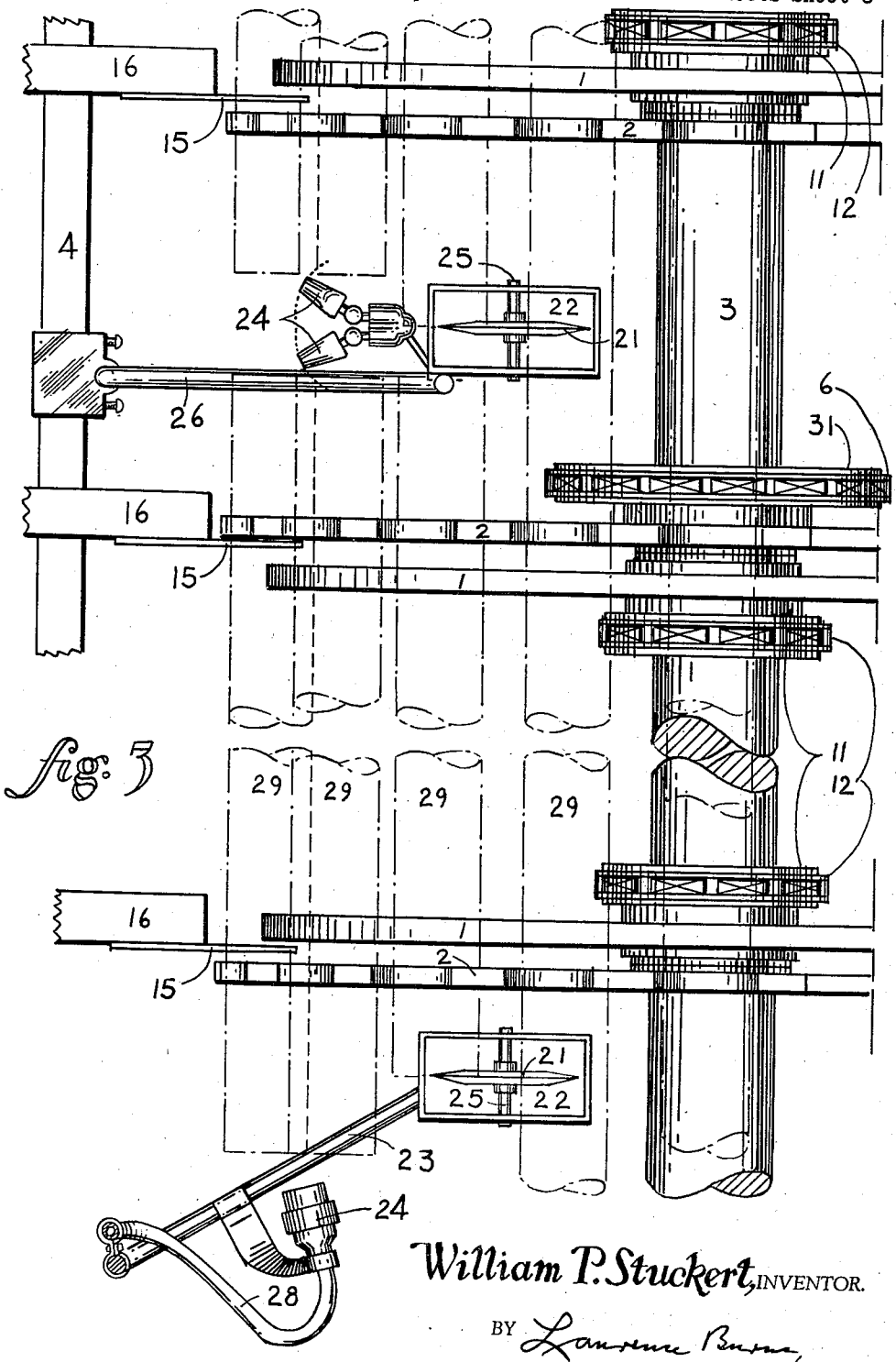

2,323,182

UNITED STATES PATENT OFFICE 2,323,182

GLASS SEVERING APPARATUS

William P. Stuckert, Marblehead, Mass., assignor to Sylvania Electric Products Inc., a corporation of Massachusetts Application February 1, 1941, Serial No. 377,053

2 Claims. (Cl. 49—50)

This invention relates to a means for cutting glass tubing.

An object of this invention is to provide a means for cutting glass tubes into desired lengths.

Another object is to provide a means for cutting glass tubes which may be adjusted to cut tubing of different lengths.

A further object is to provide a means for annealing those portions of the tubing adjacent the points where it was cut.

Another object is to provide a mechanical and automatic machine for cutting glass tubes.

Further objects, advantages and features will be apparent from the following specification taken in conjunction with the accompanying drawings in which:

Figure 1 is a projection of my tube cutting machine;

Figure 2 is a sectional view of my machine taken in the middle thereof;

Figure 3 is a top view of the same.

Many times it is desirable to cut glass tubes into portions smaller than that into which the tubing was cut when it was first formed. The means for so cutting the tubing should be capable of adjustment so as to enable the machine to be adapted to cut tubing of various diameters into as many portions as desired. The means which I have employed to cut a length of glass tubing into two or more portions embodies these desired features.

My tube cutting machine consists of a series of friction wheels functioning in conjunction with a circular rotating conveyor which in turn consists of a series of rotating wheels spaced from each other but all keyed to the same shaft. There are as many friction wheels as there are conveyor wheels since they are paired off, a friction wheel always being adjacent a conveyor wheel.

As soon as the tube to be cut is placed on the conveyor which carries it through the various stages of the cutting process, it comes in contact with the friction wheels adjacent thereto. These friction wheels are revolving at a greater speed than the speed with which the conveyor wheels are revolving. Thus the friction wheels will cause the tube to rotate while it is being carried along by the conveyor wheels.

A series of burners is located just above the conveyor wheels at a point directly above that part of the tubing which it is desired to cut. Thus the rotating and revolving tube will be carried directly beneath the path of these burners. Wet wheels are located adjacent the conveyor and friction wheels at a point where they will touch the tube just after it has passed through the path of the burners. The wet wheel, caused to rotate by its contact with the heated portion of the revolving glass tube, will sever it. Directly after the tube is cut into several portions, annealing and glazing burners directly beneath the wet wheels will anneal the heated glass thus reducing the strains therein, and glaze the new ends formed by the cutting of the glass.

As shown in Figure 1, the friction wheels 1 are paired off with the conveyor wheels 2. The conveyor wheels 2 are keyed to the shaft 3. This shaft 3 is mounted on the machine frame 4 and is turned through the chain 6 and the sprocket wheel 5 which is keyed to the shaft 7. This shaft 7 is turned by some suitable means, for example a motor, through the chain 8 and the sprocket wheel 9. Since all the conveyor wheels 2 are keyed to the shaft 3, they will all turn at the same rate of speed and this rate will be governed to a certain extent by the size of the sprocket wheel 5 which transmits the motion of the shaft 7 to the shaft 3.

As has been pointed out above, in a general way, the friction wheels 1 turn faster than the conveyor wheels 2. This increased speed is attained by employing a series of large sprocket wheels 10 keyed to the shaft 7 and a series of small sprocket wheels 11 bolted to the friction wheels 1. Unlike the conveyor wheels, these friction wheels are not keyed to the shaft 3 but are run on bearings, the inner race of which is keyed to the shaft. In this manner the speed variation between the friction wheels and the conveyor wheels is made possible. By regulating the ratio in the size of the various sprocket wheels, the speed at which the friction wheels turn in respect to the speed at which the conveyor wheels turn may be set as desired. The ratio may be set at that best suited to accomplish the particular job to be done. I have found it desirable in cutting certain glass tubes to have the friction wheel turning two to three times as fast as the conveyor wheels.

When glass tubes are to be cut into smaller portions they are rolled along the loading rack 13 and into the spaced U-shaped cut-outs 14 located about the rim of the conveyor wheels 2 which constitute the tubing conveyor. The tubes are discharged from the U-shaped cut-outs 14 by the unloading arms 15 attached to the inner end of the unloading rack 16. Thus in my machine, everything but the loading is done automatically and mechanically. The tube is caused to continuously revolve as it is carried through the path of the burners which heat those portions of the tube to be cut. It is then cut, annealed, glazed, and discharged from conveyor wheels, and all this is done mechanically.

The burners 17 connected to a gas source through the lines 30 are mounted in the frames 18. These frames are adjustably mounted on the shafts 19 so as to be capable of being moved up and down thereon in order to be located at all times directly over the adjustable friction and conveyor wheels. These shafts are suspended through the supports 20 mounted on the machine frame 4. Thus these burners may be adjusted to heat any particular portion of the tube desired and are therefore adaptable to aid in cutting any length of tubing desired.

When the size of the portions to be cut is ascertained, the location of the burners is adjusted so that the burners will heat those sections of the tubing where the cut is to take place. The tube will be in contact with the friction wheels 1 throughout the cycle. Thus it will be continuously revolving while it is being carried through the cycle by the conveyor wheels. After the revolving and rotating tube has passed through the path beneath the burners 17, it comes in contact with the wet wheels 21 located in a small water-tight box 22 mounted on a rod 23 suspended from the shaft 19.

These wet wheels 21 are small mitre-edged wheels with knurled edges to carry the water which is located in the container 22. The wet wheel assembly is mounted in such a position that the revolving tube will pass over it and causes it to rotate. The knurled edges will pick up the water. The wet mitre-edged wheel will reverse the strain set up in the heated portions of the tube and thus cause the tube to cleanly break into the desired sizes of tubing.

Since certain strains were set up in the glass by reason of heating certain portions of the tube and these strains were reversed as a result of the heated portions coming in contact with the wet wheels, these strains should be reduced if possible in order to avoid a weakening of the glass. These strains are reduced and the newly formed ends are glazed by the burners 24 which are also attached to the rod 23 suspended from the shaft 19. This annealing step is very essential because otherwise the glass would remain in a highly strained condition and probably cause much difficulty when it comes time to seal-in the ends of the tubing.

It should be noted that it is only the two end wet wheel assemblies and the two end glazing and annealing burners that are mounted from the shaft 19. It has been found desirable to mount the two corresponding inner assemblies on an adjustable mounting arm attached to the machine frame 4. This is brought out more clearly in Figure 2.

After the ends of the newly formed tubes have been annealed and glazed, the tubing conveyor carries the tubes along until they strike the tube discharging arms 15 projecting from the inner end of the unloading rack 16. These arms are so angularly disposed as to eject the tube from the conveyor and cause it to roll down the unloading rack 16. It is in this manner that the tubes are unloaded from the machine.

Figure 2 shows more clearly the arrangement of the various parts of the machine adjacent the two inner friction wheels and the two inner conveyor wheels. As was pointed out above, this figure shows the manner in which the wet wheel 21 and its container 22 are mounted. The wheel 21 is keyed to the rod 25 the ends of which are held in the side of the container 22. This container is mounted on the arm 26 adjustably attached to the machine frame 4. Thus with this arm capable of being adjusted it may be moved, along with the friction wheels and the conveyor wheels, to accommodate the cutting of different sizes of tubing. The burners 24 are attached to the rod 26, through the clip 27. These burners should be capable of adjustment so as to insure an accurate directing of the annealing fires. Any suitable flexible burner mounting may be used for this purpose. The line 28 connects the burners 24 to a source of gas.

This figure also shows more clearly just how the discharging arms 15 operate. These arms 15 project from the innermost extension of the unloading rack 16 and are so angularly disposed as to eject the tubes 29 after they have been cut and annealed.

Figure 3 is a top view of a part of the machine. It brings out more clearly certain features of the machine. For example, it shows how the burners 24, which are located in the middle of the machine to provide for the annealing of the middle portion of the tube which has been cut, may be adjustably mounted and thus capable of being accurately directed to properly anneal the tubes.

This figure shows the sprocket wheels 11 bolted to the friction wheels 1. The sprocket wheel 31 keyed to the driven shaft 3 is connected to the drive shaft 7 and the sprocket wheel 5 thereon, through the chain 6.

What I claim is:

1. Apparatus for severing elongated glass tubes comprising: a series of revolving conveyor wheels keyed to a shaft for rotation therewith and having a plurality of U-shaped cut-outs about the periphery thereof for supporting said tubes in rotational and bodily freedom of movement; a series of friction wheels, for rotating said glass tubes, located adjacent said conveyor wheels and geared for rotation about said shaft through a bearing connection therewith, at a speed greater than that of the conveyor wheels, said friction wheels having radii slightly greater than the distance from the center of said conveyor wheels to the deepest point to which the U-shaped cut-outs about the conveyor periphery extend, whereby glass tubes in said cut-outs will be contacted and rotated by said friction wheels; a series of burners located above said shaft and in heating range of tubes placed in said cut-outs; a series of wet wheels located adjacent the conveyor and friction wheel peripheries at a point where the portions of the tubes heated by said burners will establish contact therewith just after said heating; with the only pressure of said contacts derived from gravital action on said tubes; a series of annealing burners located below said wet wheels adjacent the conveyor and friction wheel peripheries with those portions of the tubes with which the wet wheels have come in contact, in heating range thereof; and a series of ejector arms adjacent the conveyor and friction wheel peripheries and beneath said annealing burners to contact and eject the tubes.

2. The combination of claim 1, in which the burners are supported from a pair of rods above the conveyor wheels and parallel to the shaft to which said conveyor wheels are keyed.

WILLIAM P. STUCKERT.